United States Patent
Lee et al.

(10) Patent No.: US 10,026,985 B2
(45) Date of Patent: Jul. 17, 2018

(54) APPARATUS FOR ACTIVATING MEMBRANE ELECTRODE ASSEMBLY FOR FUEL CELLS

(71) Applicant: HYUNDAI MOTOR COMPANY, Seoul (KR)

(72) Inventors: Nam Doo Lee, Ulsan (KR); Ji Won Yu, Ulsan (KR)

(73) Assignee: Hyundai Motor Company, Seoul (KR)

( * ) Notice: Subject to any disclaimer, the term of this patent is extended or adjusted under 35 U.S.C. 154(b) by 300 days.

(21) Appl. No.: 14/869,986

(22) Filed: Sep. 29, 2015

(65) Prior Publication Data

US 2016/0111745 A1    Apr. 21, 2016

(30) Foreign Application Priority Data

Oct. 21, 2014    (KR) .................. 10-2014-0142800

(51) Int. Cl.
| | |
|---|---|
| *H01M 8/24* | (2016.01) |
| *H01M 8/2404* | (2016.01) |
| *H01M 8/04119* | (2016.01) |
| *H01M 8/04223* | (2016.01) |
| *H01M 8/1018* | (2016.01) |

(52) U.S. Cl.
CPC ..... *H01M 8/2404* (2016.02); *H01M 8/04156* (2013.01); *H01M 8/04223* (2013.01); *H01M 2008/1095* (2013.01); *H01M 2250/20* (2013.01); *Y02T 90/32* (2013.01)

(58) Field of Classification Search
CPC .................................................. H01M 8/2404
See application file for complete search history.

(56) References Cited

U.S. PATENT DOCUMENTS

2015/0380761 A1* 12/2015 Watanabe ........... H01M 8/2404
29/623.1

FOREIGN PATENT DOCUMENTS

| JP | 2009-176463 A | 8/2009 |
|---|---|---|
| KR | 10-0158741 B1 | 8/1998 |
| KR | 10-0709482 B1 | 4/2007 |

* cited by examiner

*Primary Examiner* — Ula C Ruddock
*Assistant Examiner* — Tony S Chuo
(74) *Attorney, Agent, or Firm* — McDermott Will & Emery LLP (57) ABSTRACT

An apparatus for activating a membrane electrode assembly (MEA) for fuel cells includes: a frame. A plurality of separation plates are disposed on an upper side of a base plate, which is disposed on a top portion of the frame, to move straightly in a length direction. The plurality of separation plates are spaced apart from each other with the MEA interposed therebetween in the direction in which the separation plates move. A tilt unit, which is connected to the frame and the base plate, upwardly tilt the base plate with respect to the frame and remove a coolant generated when the MEA is activated.

23 Claims, 9 Drawing Sheets

APPARATUS FOR ACTIVATING MEMBRANE ELECTRODE ASSEMBLY FOR FUEL CELLS

CROSS-REFERENCE TO RELATED APPLICATION

This application claims the benefit of priority to Korean Patent Application No. 10-2014-0142800 filed in the Korean Intellectual Property Office on Oct. 21, 2014, the entire content of which is incorporated herein by reference.

TECHNICAL FIELD

The present disclosure relates to a system for activating a fuel cell. More particularly, the present disclosure relates to an apparatus for activating a membrane electrode assembly (MEA) for fuel cells, which is capable of activating and evaluating performance of the MEA for the fuel cells.

BACKGROUND

A fuel cell includes an electrode for generating an electrochemical reaction with a fuel and an oxidizer, a polymer electrolyte membrane for transferring protons generated by the reaction, and a separator (also called a "separation plate") for supporting the electrode and the polymer electrolyte membrane.

A polymer electrolyte fuel cell has been increasingly used as a fuel cell for vehicle. The polymer electrolyte fuel cell has high efficiency, high current density and output density, and a short starting time. Further, the polymer electrolyte fuel cell does not easily corrode, and does not need to control an electrolyte due to the use of a polymer electrolyte.

In the automotive industries, active research is being carried out on the polymer electrolyte fuel cell because it discharges only water as exhaust gas.

The polymer electrolyte fuel cell produces electrical energy while generating water and heat through an electrochemical reaction between a fuel including hydrogen, and an oxidizer such as air.

That is, in the polymer electrolyte fuel cell, the supplied fuel is separated into protons and electrons in the catalyst of the anode, and the separated protons are transferred to the cathode through a polymer electrolyte membrane. In this case, the separated protons are combined with a supplied oxidizer and electrons received through an external conductor, thereby generating the electrical energy while generating water.

In a typical fuel cell for a vehicle, in order to obtain high potential, unit cells are stacked according to required potential. The stacked unit cells are called a stack.

The electrode of the fuel cell includes a mixture of hydrogen ion carriers and a catalyst. In an initial operation of the fuel cell, activities of electrochemical reaction may be low since reactants are unable to reach the catalyst when the moving path of the reactants is clogged, the hydrogen ion carriers forming a triple phase interface are not easily hydrolyzed in the initial operation, and it is difficult to secure the continuous mobility of hydrogen ions and electrons.

Accordingly, in order to secure maximum performance of fuel cells after the fuel cells are assembled in a fuel cell stack, that is, an electrical generation aggregate of the fuel cells which includes a membrane electrode assembly (MEA) including an electrode, a polymer electrolyte membrane, and a separator, an activation and performance evaluation procedure needs to be performed on the fuel cells.

The activation and performance evaluation removes remaining impurities that flow in a process of manufacturing a membrane-electrode assembly and a fuel cell stack, activates sites that do not participate in a reaction, secures a moving passage in which reactants may move to a catalyst, and secures a hydrogen ion passage by sufficiently hydrolyzing an electrolyte included in the polymer electrolyte membrane and an electrode.

The activation of fuel cells is performed in various ways according to fuel cell manufacturers, but a major activation method is a long-time operation at a specific voltage.

After a plurality of fuel cells is stacked, a conventional system for activating the fuel cells supplies a fuel and an oxidizer to the fuel cells and activates the fuel cells by applying electrical energy, which is generated from the fuel cells, to an electronic load.

In this case, the activation and performance evaluation process of fuel cells is performed after the fuel cells are assembled into a fuel cell stack. If a failure occurs in a specific fuel cell that forms the fuel cell stack, the fuel cell stack may explode. Thus, the defective fuel cell must be replaced or removed, and the fuel cells must be assembled again. Accordingly, a time delay occurs in performing the activation and performance evaluation.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an apparatus for activating a membrane electrode assembly (MEA) for fuel cells, which has an advantage of activating the MEA before the fuel cells are assembled into a fuel cell stack.

An apparatus for activating a membrane electrode assembly (MEA) for fuel cells according to an exemplary embodiment of the present inventive concept may include a frame. A plurality of separation plates are disposed on an upper side of a base plate, which is disposed on a top portion of the frame, to move straightly in a length direction and are spaced apart from each other with the MEA interposed therebetween in the direction in which the separation plates move. A tilt unit, which is connected to the frame and the base plate, upwardly tilts the base plate with respect to the frame and removes a coolant generated when the MEA is activated.

The base plate may be rotatably coupled with the frame at one end of the base plate by a rotation shaft.

The tilt unit may include a tilt lever rotatably mounted to another end of the frame with an operation handle. A connection rod has one end rotatably coupled with the tilt lever and another end thereof connected the base plate through a ball joint.

The tilt unit may include a pair of gas lifts, each of which has one end connected to the base plate and another end connected to the frame.

An apparatus for activating an MEA for fuel cells according to another exemplary embodiment of the present inventive concept may include a stationary body fixedly mounted on a top portion of a base plate. A movable body is disposed on the top portion of the base plate to slide in a reciprocating motion along guide rails. A plurality of separation plates are spaced apart from each other between the stationary body and the movable body and maintain each space between the plurality of separation plates in which the MEA is interposed. A connection link, which is connected to the stationary body and the movable body, link-couples the plurality of separation plates at each side of the plurality of separation plates.

The apparatus may further include a press unit, which is slidably coupled with the guide rails, connected to and pressurizing the movable body. A support block, which is attached to the press unit through a press screw and slidably coupled with the guide rails, applies pressure to the press unit by the press screw. A location fixing member is coupled with the support block to move up and down and selectively coupled with the stationary body.

The apparatus may further include an end plate disposed between the separation plates and the movable body.

The plurality of separation plates may receive a fuel and an oxidizer and discharge an unreacted fuel, the oxidizer, and a coolant through the stationary body.

A pair of side guides, which are fixedly mounted to the stationary body, may penetrate both sides of the plurality of separation plates and guide the plurality of separation plates.

A pair of bottom guides, which are fixedly mounted to the stationary body, may penetrate a bottom portion of the plurality of separation plates and guide the plurality of separation plates.

Each of the separation plates may include a flow path plate made of a graphite material and having flow path patterns on both sides of the flow path plate, and a sub-plate made of a steel material and bonded to an edge of the flow path plate.

The flow path plate may be bonded to the sub-plate through epoxy adhesives.

First guide holes, into which side guides are inserted, may be formed at upper edges on both sides of the plurality of separation plate.

Second guide holes, into which bottom guides are inserted, may be formed at a bottom side of the separation plate.

The plurality of separation plates may have a polytetrafluoroethylene (PTFE) tape made of an insulating material bonded to a surface of the pair of side guides and a surface of the pair of bottom guides.

The connection link may include a plurality of link clips link-coupled with first connection rings, which are attached to both sides of the plurality of separation plates, and second connection rings which are attached to both sides of the stationary body and the movable body.

The plurality of link clips, which are provided in an even number to connect the plurality of separation plates through the first connection rings, may be disposed in a first line. The plurality of link clips, which are provided in an odd number to connect the plurality of separation plates through the first connection rings and connect the stationary body and the movable body through the second connection rings, may be disposed in a second line.

The press unit may include a press block slidably coupled with the guide rails. A plurality of press members penetrate the press block and are coupled with the movable body. Spring members are disposed on the press member within the press block and apply an elastic force to the movable body through the press member.

The press screw, which penetrates the support block, may be rotatably connected to the press block through a bearing and screwed onto the press block.

A stopper may be engaged with the press screw and fixing the movement of the movable body.

The location fixing member may include an elevation plate mounted on the support block to move up and down by the guide shafts. At least one link bar is link-coupled with the elevation plate and selectively coupled with the stationary body.

The link bar may be selectively coupled with a coupling pin mounted on the stationary body. One end of the link bar may be link-coupled with the elevation plate through a link pin, and another end of the link bar is selectively coupled with the coupling pin through the link hole.

An elevation unit moves the elevation plate along with the guide shafts and the link bar up and down.

The elevation unit may include an elevation lever rotatably mounted to the support block through an operation handle. An elevation rod is fixedly attached to the elevation lever to lift or lower the elevation plate.

The base plate may be mounted on a top portion of a frame that is movable by casters mounted to a bottom portion thereof.

The base plate may tilt upwardly with respect to the frame through a tilt unit.

The stationary body may discharge a coolant generated when the MEA is activated as the base plate tilts upwardly by the tilt unit.

Exemplary embodiments of the present inventive concept can solve inconvenience attributable to a process of exploding a fuel cell stack and restacking fuel cells as in a conventional art because an activation and performance evaluation process is performed on an MEA, and the fuel cells can be assembled into the fuel cell stack when an abnormal cell is detected in advance.

According to the exemplary embodiment of the present invention, work hours according to activation and performance evaluation for the MEA can be reduced, and productivity of a fuel cell stack can be further maximized.

The exemplary embodiment of the present inventive concept improves productivity and reduces a failure rate because a conventional process of exploding a fuel cell stack and stacking fuel cells is eliminated by removing an abnormal cell in advance before the fuel cell stack is assembled and the abnormal can be rapidly replaced by securing the MEA activated before stacking the fuel cells.

BRIEF DESCRIPTION OF THE DRAWINGS

Reference is made to the following drawings in order to describe exemplary embodiments of the present inventive concept, and thus the technical spirit of the present disclosure should not be construed as being limited to the accompanying drawings.

DETAILED DESCRIPTION OF THE EMBODIMENTS

Hereinafter, the present disclosure will be described more fully with reference to the accompanying drawings, in which exemplary embodiments are illustrated. As those skilled in the art would realize, the described embodiments may be modified in various different ways, all without departing from the spirit or scope of the present disclosure.

In order to clearly describe the present disclosure, a description of parts not related to the description is omitted, and the same reference numbers are used throughout the drawings to refer to the same or like parts.

The size and thickness of each of elements illustrated in the drawings are arbitrarily illustrated for ease of description, and the present disclosure is not limited thereto. In the drawings, the thicknesses of parts and regions have been enlarged for clarity.

In the following detailed description, the terms, such as the first and the second, are used is to distinguish between elements since the first and the second respectively have the same constructions, and thus the elements are not limited to such order in the following description.

In the entire specification, In addition, unless explicitly described to the contrary, the word "comprise" and variations such as "comprises" or "comprising" will be understood to imply the inclusion of stated elements but not the exclusion of any other elements.

Furthermore, each of terms, such as " . . . unit," " . . . means," " . . . part," and " . . . member," described in the specification, means a unit of a comprehensive element that performs at least one function or operation.

Figure 1:
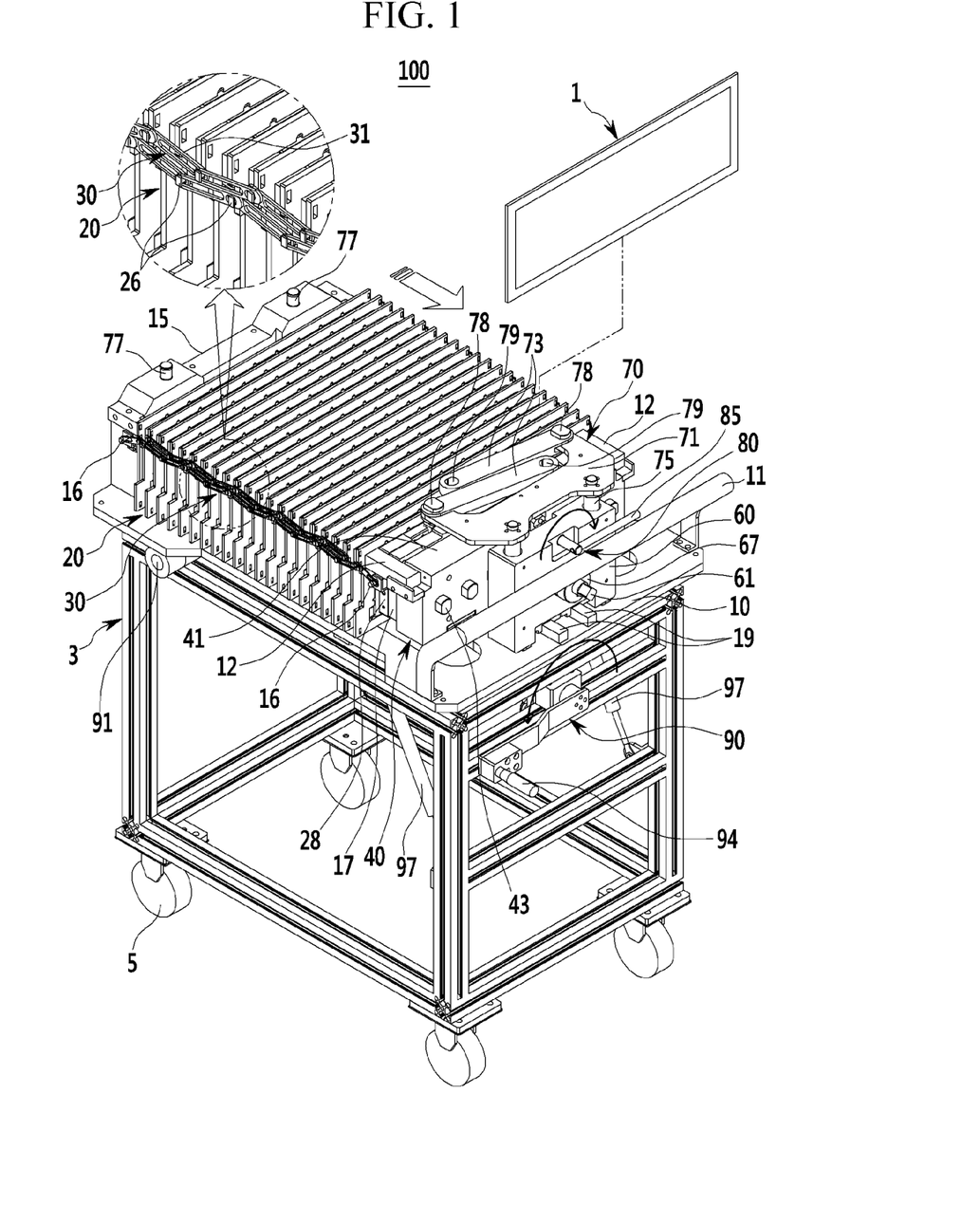
FIGS. 1 and 2 are perspective views illustrating an apparatus for activating an MEA for fuel cells according to an exemplary embodiment of the present inventive concept.
Figure 2:
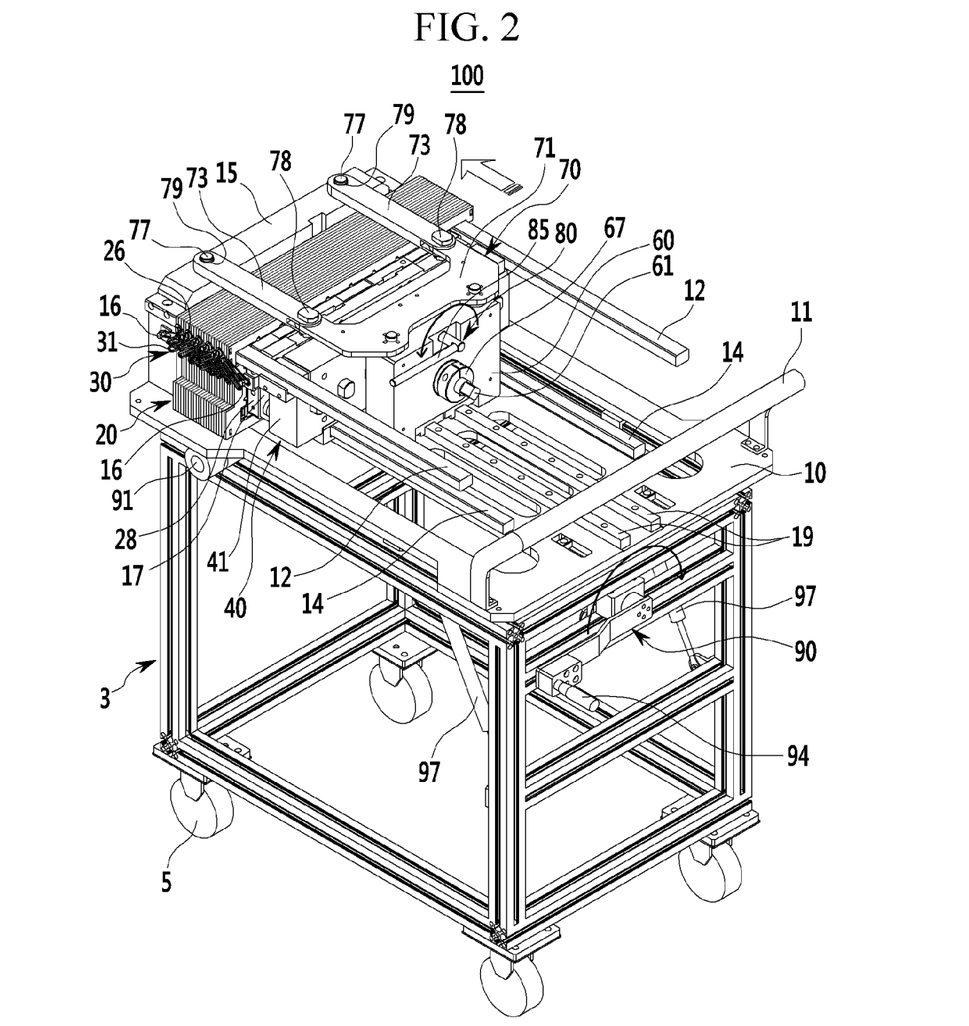

FIGS. 1 and 2 are perspective views illustrating an apparatus for activating an MEA for fuel cells according to an exemplary embodiment of the present inventive concept.

Referring to FIGS. 1 and 2, an apparatus 100 for activating an MEA for fuel cells according to an exemplary embodiment of the present inventive concept may secure performance of a fuel cell stack in which a plurality of fuel cells have been stacked.

For example, the apparatus 100 for activating an MEA for fuel cells according to an exemplary embodiment of the present inventive concept may activate the MEA 1 that forms fuel cells, and evaluate performance of the MEA 1.

That is, the apparatus 100 for activating an MEA may supply fuel and an oxidizer to each of fuel cells, and perform an activation and performance evaluation on the MEA 1 to apply a specific voltage from a fuel cell to an electron load.

The apparatus 100 for activating an MEA may include a fluid pipe connection unit (not illustrated) for connecting a fluid pipe to a fuel cell, an output cable connection unit (not illustrated), and a connector connection unit (not illustrated).

In this case, the fuel and the oxidizer may be supplied to the fuel cells through the fluid pipe, and unreacted fuel, oxidizer, and coolant from the fuel cells may be discharged.

The apparatus 100 for activating the MEA for fuel cells according to an exemplary embodiment of the present inventive concept activates the MEA 1 before fuel cells are assembled into a fuel cell stack.

That is, the apparatus 100 for activating an MEA according to the present disclosure performs the activation and performance evaluation process on the MEA 1 and assembling the fuel cells into a fuel cell stack when an abnormal bad cell (i.e., a bad unit fuel cell) is detected in advance.

Here, the apparatus 100 for activating an MEA according to the present disclosure includes a frame 3, a base plate 10, a stationary body 15, a movable body 17, separation plates 20, a connection link 30, a press unit 40, a support block 60, and a location fixing member 70.

In an exemplary embodiment of the present inventive concept, the frame 3 supports various constituent elements to be described below, and may include a single frame or two or more segmented frames.

The frame 3 may include various attached elements, such as brackets, bars, rods, plates, housings, cases, blocks, barrier ribs, ribs, rails, and collars for supporting the constituent elements.

The aforementioned attached elements are used to install the constituent elements in the frame 3. In the present disclosure, the aforementioned attached elements are commonly called the frame 3 except in exceptional cases.

In this case, the frame 3 includes a horizontal frame and a vertical frame. A caster 5 is installed at each of the corners of a rectangular frame at a bottom portion of the frame 3. Accordingly, the frame 3 may freely move in all directions through the casters 5.

In the present disclosure, the base plate 10 supports various constituent elements to be described below, and is installed on a top portion of the frame 3.

The base plate 10 may be fixedly installed on the top portion of the frame 3. The base plate 10 may have one side rotatably coupled with the frame 3, and the base plate 10 may be installed movably up and down based on the one side thereof.

The base plate 10 includes a handle 11 that may be held by a user so that the apparatus 100 can freely move in various directions through the casters 5 of the frame 3.

In the present disclosure, the stationary body 15 supports the separation plates 20 to be described in more detail later, and is fixedly installed on one side (i.e., a left part in FIG. 1) of the top portion of the base plate 10.

The stationary body 15 has a block shape and may be fixedly installed on one side of the top portion of the base plate 10 through bolts.

In the present disclosure, the movable body 17 is installed to perform a straight-line reciprocating motion (i.e., side to side directions in FIG. 1) on the top portion of the base plate 10 in accordance with the stationary body 15.

The movable body 17 has a block shape and is slidably coupled with at least one guide rail 19 (also called a "linear guide") provided on the top portion of the base plate 10.

A pair of the guide rails 19 may be installed in parallel on the top portion of the base plate 10 to be disposed longitudinally.

In the present disclosure, the separation plates 20 may supply the fuel and the oxidizer to the MEA 1 on which the activation and performance evaluation are to be performed, and discharge unreacted fuel and oxidizer within the MEA 1 and a coolant generated from the MEA 1 through an electrochemical reaction between the fuel and the oxidizer.

For reference, the separation plates 20 are different from separation plates for a fuel cell stack that is completed, and are separately manufactured for the activation and performance evaluation of the MEA 1.

The separation plates 20 are coupled by the connection link 30 to be described later and are coupled with the stationary body 15 and the movable body 17. The separation plates 20, together with the movable body 17, may perform a straight-line reciprocating motion on the top portion of the base plate 10 from side to side.

The separation plates 20 may be installed between the stationary body 15 and the movable body 17, and may maintain a specific interval or pressurize the MEA 1 with the MEA 1 interposed therebetween using the movable body 17.

Figure 3:
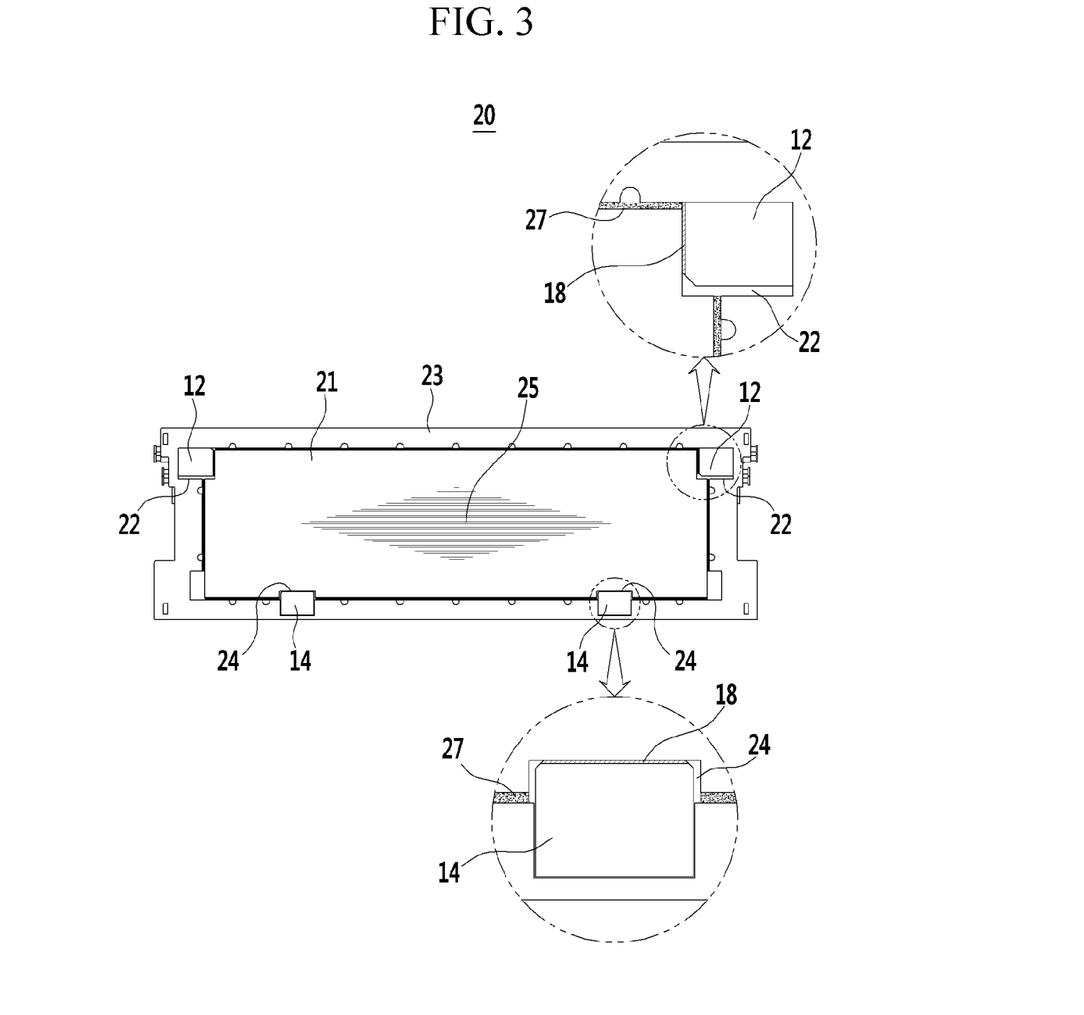
FIG. 3 is a diagram illustrating a separation plate portion applied to the apparatus for activating an MEA for fuel cells according to an exemplary embodiment of the present inventive concept.

FIG. 3 is a diagram illustrating a separation plate portion applied to the apparatus for activating an MEA according to an exemplary embodiment of the present inventive concept.

Referring to FIG. 3, each of the separation plates 20 according to an exemplary embodiment of the present inventive concept may include a flow path plate 21 and a sub-plate 23. The flow path plate 21 is made of graphite materials and has flow path patterns 25 formed on both sides thereof. The flow path patterns 25 are flow path channels along which the fuel, the oxidizer, and the coolant flow.

Furthermore, the sub-plate 23 supports the edge portion of the flow path plate 21 and may be made of steel plated with white zinc, for example. In this case, the sub-plate 23 is integrated and bonded to the edge portion of the flow path plate 21. For example, the sub-plate 23 may be bonded to an edge of the flow path plate 21 through epoxy adhesives 27.

Referring to FIGS. 1 to 3, as described above, the separation plates 20, together with the movable body 17, perform a straight-line reciprocating motion from side to side on the top portion of the base plate 10. Here, a pair of side guides 12 penetrating both sides of the separation plates 20 and guiding the separation plates 20 are fixedly installed in the stationary body 15.

Each of the side guides 12 is a guide bar having a rectangular cross-sectional shape. One end of each of the side guides 12 is fixedly coupled with a top on both sides of the stationary body 15, and another end of each of the side guides 12, that is, free ends, is disposed above one side of the base plate 10.

Furthermore, a pair of bottom guides 14 which penetrate the bottoms of the separation plates 20 and guide the separation plates 20, are fixedly installed in the stationary body 15.

Each of the bottom guides 14 is a guide bar having a rectangular cross-sectional shape. One end of each of the bottom guides 14 are fixedly inserted into both sides at a lower part of the stationary body 15, and another end of each of the bottom guides 14, that is, free ends, is disposed on the base plate 10.

Furthermore, first guide holes 22, into which the side guides 12 are inserted, are formed at upper edges on both sides (i.e., edges where the flow path plate and the sub-plate are connected) of the separation plates 20. Second guide holes 24 into which the bottom guides 14 are inserted are formed at bottoms on both sides (i.e., lower parts where the flow path plate and the sub-plate are connected) of the separation plates 20.

Referring to FIG. 3, a polytetrafluoroethylene (PTFE) tape 18 made of insulating materials for insulation between the flow path plate 21 and the sub-plate 23 is attached to a surface of the side guide 12 that is inserted into the first guide hole 22 and is in contact with the flow path plate 21.

The PTFE tape 18 made of insulating materials for insulation between the flow path plate 21 and the sub-plate 23 is attached to a surface of the bottom guide 14 that is inserted into the second guide hole 24 and is in contact with the flow path plate 21.

Referring to FIGS. 1 and 2 the connection link 30 couples the separation plates 20, the stationary body 15, and the movable body 17. The connection link 30 is linked to both sides of the separation plates 20 and connected to the stationary body 15 and the movable body 17.

In this case, the connection links 30 function as a stopper for regularly maintaining the intervals between the separation plates 20 when the movable body 17 moves the separation plates 20 in the opposite direction through the side guides 12 and the bottom guides 14.

The connection link 30 also supports the separation plates 20 that are pressurized when the movable body 17 moves the separation plates 20 in one direction (i.e., on the stationary body side) of the base plate 10 through the side guides 12 and the bottom guides 14.

The connection link 30 includes a plurality of link clips 31 linked to both sides of the separation plates 20 and linked to both sides of the stationary body 15 and the movable body 17. The link clip 31 may be a common office clip.

Both ends of the link clip 31 may be linked to first connection rings 26 provided on both sides of each of the separation plates 20, and may be linked to second connection rings 16 provided on both sides of the stationary body 15 and the movable body 17.

In this case, an even number of the link clips 31 may connect the separation plates 20 through the first connection rings 26 and may be disposed in one line. An odd number of the link clips 31 may connect the separation plates 20 through the first connection rings 26, may connect the stationary body 15 and the movable body 17 through the second connection rings 16, and may be disposed in another line.

An end plate 28 is installed in the movable body 17 between the stationary body 15 and the movable body 17 and supports the separation plates 20 and implements a flow of the fuel, the oxidizer, and the coolant. The end plate 28 may be integrally combined with the movable body 17.

When the end plate 28 is installed in the movable body 17 between the stationary body 15 and the movable body 17 as described above, the fuel and the oxidizer may be supplied to the separation plates 20 through the stationary body 15, and unreacted fuel, oxidizer. The coolant may be discharged through the stationary body 15.

In the present disclosure, the press unit 40 pressurizes the movable body 17. The press unit 40 may substantially pressurize the separation plates 20 between the movable body 17 and the stationary body 15, and may closely attach the MEA 1 to the separation plates 20.

The press unit 40 is slidably coupled with the guide rails 19 on the base plate 10 and connected to the movable body 17.

Figure 4:
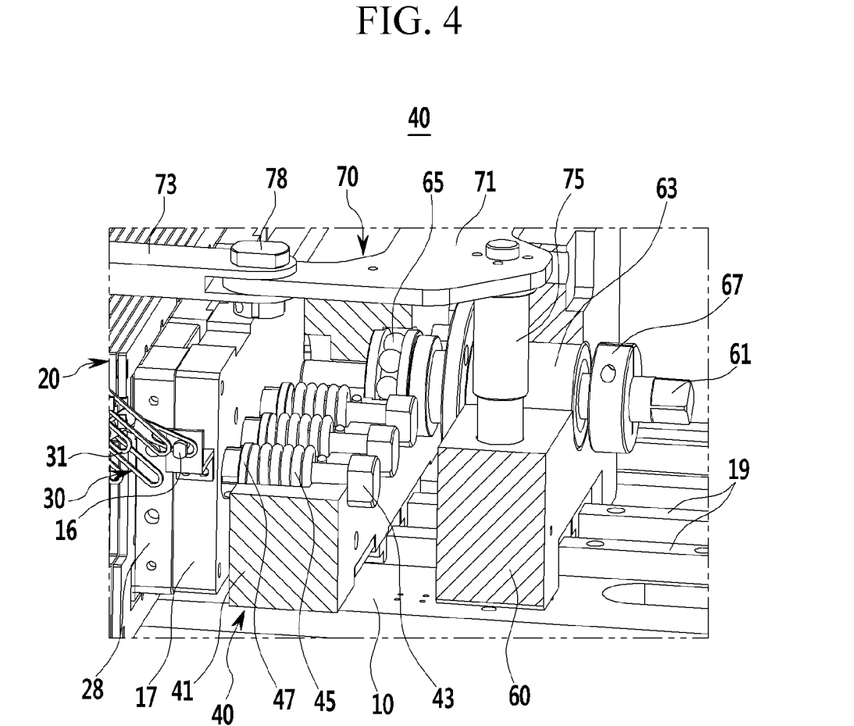
FIG. 4 is a diagram illustrating a press unit portion applied to the apparatus for activating an MEA for fuel cells according to an exemplary embodiment of the present inventive concept.

FIG. 4 is a diagram illustrating a press unit portion applied to the apparatus for activating an MEA according to an exemplary embodiment of the present inventive concept.

Referring to FIG. 4, the press unit 40 according to an exemplary embodiment of the present inventive concept may include a press block 41, press members 43, and spring members 45.

The press block 41 is slidably coupled with the guide rails 19 on the base plate 10. The press members 43 penetrate the press block 41 and are coupled with the movable body 17.

Each of the press members 43 has a screw thread formed at one end and a screw head formed at another end, and is provided in the form of a bolt. The press members 43 may penetrate the press block 41 and may be coupled with the movable body 17 through their screw heads when they support the press block 41 through their heads.

Furthermore, the spring members 45 apply a predetermined elastic force to the movable body 17 through the press members 43 and are installed in the respective press members 43 within the press block 41.

For example, the spring members 45 may include compression coil springs and are inserted into the press members 43 within the press block 41. In this case, an end on one side of each of the spring members 45 is supported to an inner latch stage within the press block 41, and an end on another side thereof is supported to a separation prevention ring 47 provided in the press members 43.

That is, when a predetermined pressure is applied to the press block 41 and the spring member 45 moves to the movable body 17 by the pressure applied to the press block 41, the spring member 45 is compressed by the press block 41 between the inner latch stage and the separation prevention ring 47, thus applying an elastic force to the movable body 17.

Referring to FIGS. 1, 2, and 4, in an exemplary embodiment of the present inventive concept, the support block 60 supports the press block 41 of the press unit 40, supports the location fixing member 70 to be described in more detail later, and applies the pressure to the press unit 40.

The support block 60 is slidably coupled with the guide rails 19 on the base plate 10 and is also coupled with the press block 41 of the press unit 40 through a press screw 61. That is, the support block 60 may apply pressure to the press block 41 of the press unit 40 by the press screw 61.

The press screw 61 penetrates and is installed in the support block 60. The press screw 61 is installed in the support block 60 through a cylindrical guider 63 to penetrate the support block 60. The press screw 61 is rotatably mounted on the press block 41 through a bearing 65 and is screwed onto the press block 41.

Furthermore, a stopper 67 engaged with the support block 60 is fixedly installed in a free stage on the side opposite the coupling stage of the press screw 61. Accordingly, when the press screw 61 rotates, the support block 60 applies pressure to the press block 41 by the press screw 61. The press block 41 may pressurize the movable body 17 while moving toward the movable body 17 along the guide rails 19. The stopper 67 is engaged with the support block 60 and may suspend the rotation of the press screw 61.

Referring to FIGS. 1 and 2, the location fixing member 70 fixes the position of the support block 60 with respect to the stationary body 15. The location fixing member 70 may be coupled with the support block 60 movably up and down and may be selectively coupled with the stationary body 15.

The location fixing member 70 may include an elevation plate 71 and a pair of link bars 73. The elevation plate 71 is installed in the support block 60 through a pair of guide shafts 75 to move up and down.

The pair of guide shafts 75 are inserted into both sides of the support block 60 to move up and down. The elevation plate 71 is fixedly installed at a top portion of the guide shafts 75. That is, the elevation plate 71 may move up and down along with the guide shafts 75.

The link bars 73 are linked to the elevation plate 71 and selectively coupled with the stationary body 15. The pair of link bars 73 are linked to the elevation plate 71 and may be selectively coupled with coupling pins 77 provided in the stationary body 15.

In this case, ends on one side of the link bars 73 may be linked to the elevation plate 71 through link pins 78, and ends on another side of the link bars 73 may be selectively coupled with the coupling pins 77 through link holes 79.

That is, when the elevation plate 71 upwardly moves through the guide shafts 75, the link bars 73 may be detached from the coupling pins 77 of the stationary body 15. When the elevation plate 71 downwardly moves through the guide shafts 75, the link bars 73 may be coupled with the coupling pins 77 of the stationary body 15.

In the present disclosure, the support block 60 includes an elevation unit 80 moving the elevation plate 71 of the location fixing member 70 up and down along with the guide shafts 75 and the link bars 73.

Figure 5A:
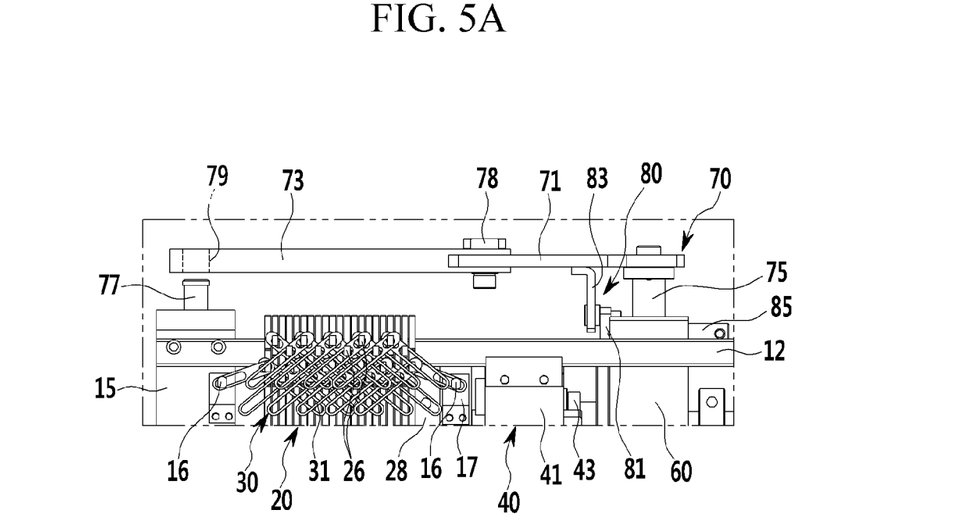
FIGS. 5A and 5B are diagrams illustrating an elevation unit portion applied to the apparatus for activating an MEA for fuel cells according to an exemplary embodiment of the present inventive concept.
Figure 5B:
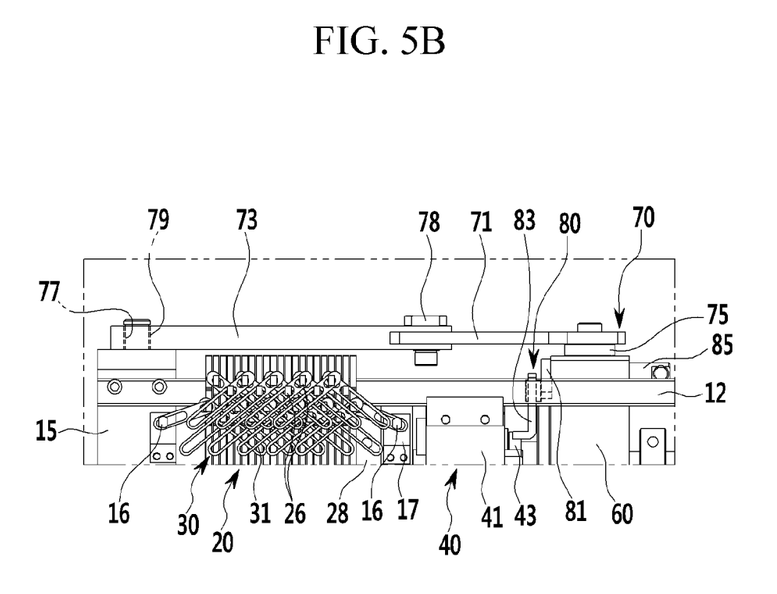

FIGS. 5A and 5B are diagrams illustrating an elevation unit applied to the apparatus for activating an MEA according to an exemplary embodiment of the present inventive concept.

In the present disclosure, the elevation unit 80 may include an elevation lever 81 and an elevation rod 83. The elevation lever 81 is rotatably installed in the support block 60 through an operation handle 85. That is, the elevation lever 81 is fixedly installed at a center of rotation of the operation handle 85 and rotates along with the operation handle 85.

The elevation rod 83 may be a rod bent in an "L" form, and is fixedly installed in the elevation lever 81. Referring to FIG. 5A, when the operation handle 85 rotates 180 degrees from one direction to the other direction, the elevation lever 81 rotates along with the operation handle 85, and thus, the elevation rod 83 may move the elevation plate 71 upwardly along with the guide shafts 75 and the link bars 73. Referring to FIG. 5B, when the operation handle 85 rotates 180 degrees from the other direction to the one direction, the elevation lever 81 rotates along with the operation handle 85, and thus, the elevation rod 83 may move the elevation plate 71 downwardly along with the guide shafts 75 and the link bars 73.

Figure 6:
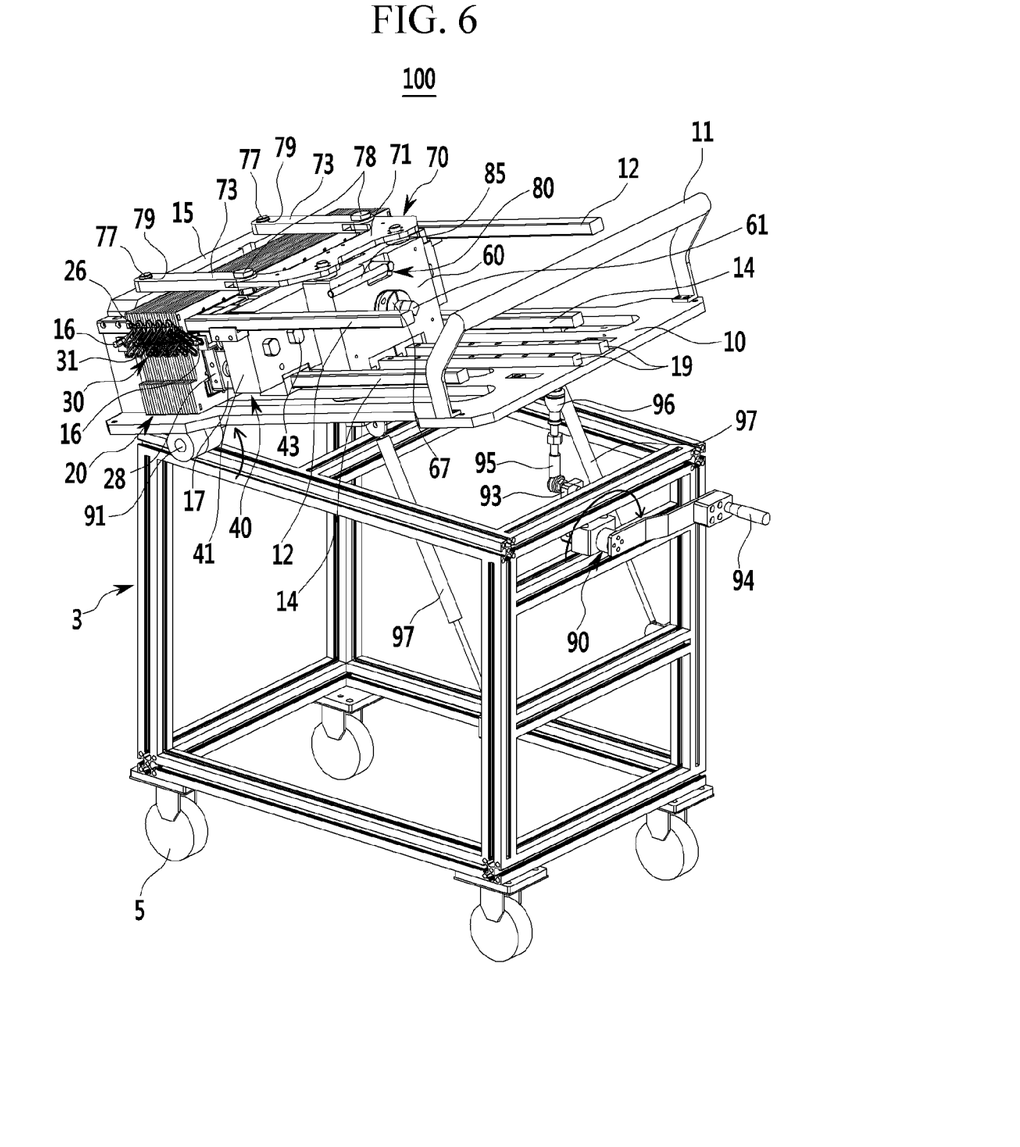
FIG. 6 is a perspective view illustrating an exemplary modification of the apparatus for activating an MEA for fuel cells according to an exemplary embodiment of the present inventive concept.

FIG. 6 is a perspective view illustrating an exemplary modification of the apparatus for activating an MEA according to an exemplary embodiment of the present inventive concept.

Referring to FIG. 6, the exemplary modification of the apparatus 100 for activating an MEA according to an exemplary embodiment of the present inventive concept may include a tilt unit 90 for upwardly tilting the base plate 10 with respect to the frame 3 and removing a coolant generated when activating the MEA 1.

That is, when the tilt unit 90 tilts the base plate 10 upwardly, the coolant generated when the MEA 1 is activated can be externally discharged through the stationary body 15. The base plate 10 is installed on the top portion of the frame 3 to tilt up and down. One side of the base plate 10 is rotatably coupled with one side on the frame 3 through a rotation shaft 91.

Accordingly, the base plate 10 may tilt up and down through the tilt unit 90 while rotating to another side of the base plate 10 around the rotation shaft 91 with respect to one side of the frame 3.

Figure 7A:
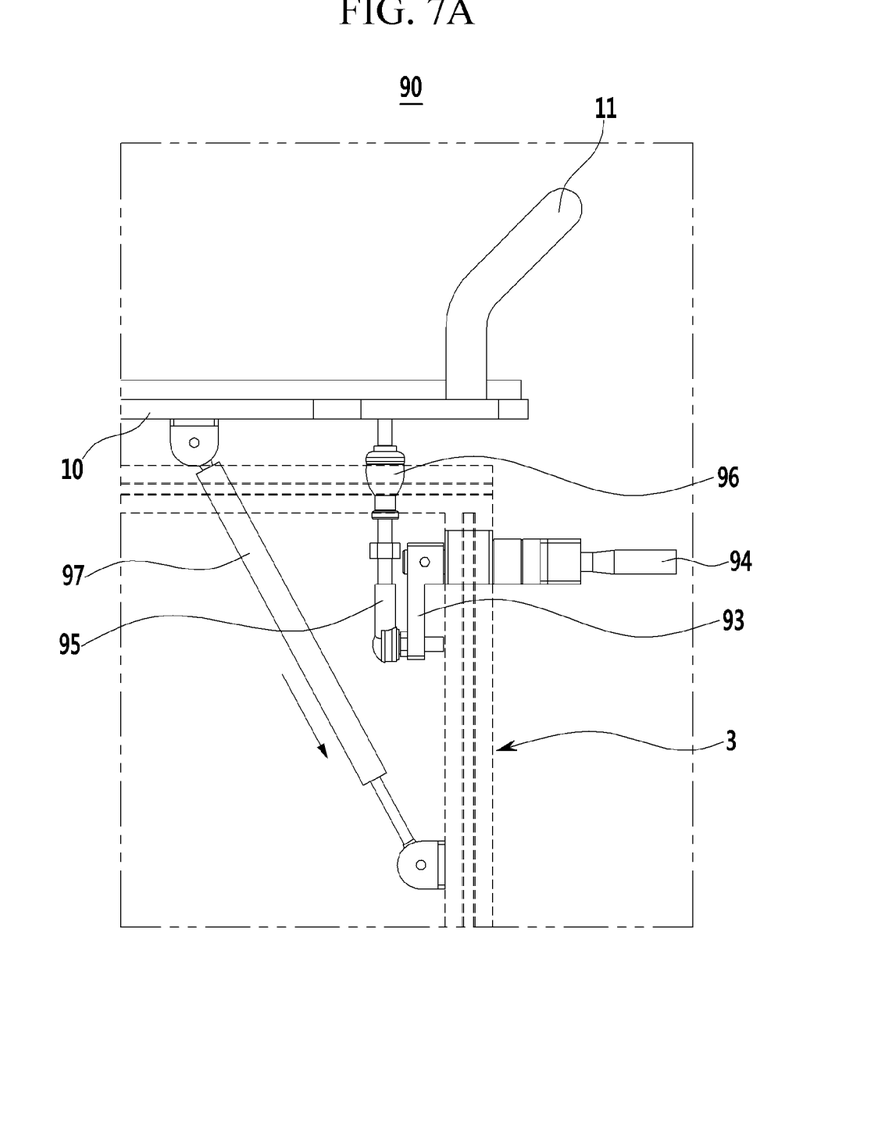
FIGS. 7A and 7B are diagrams illustrating a tilt unit portion applied to the apparatus for activating an MEA for fuel cells according to an exemplary embodiment of the present inventive concept.
Figure 7B:
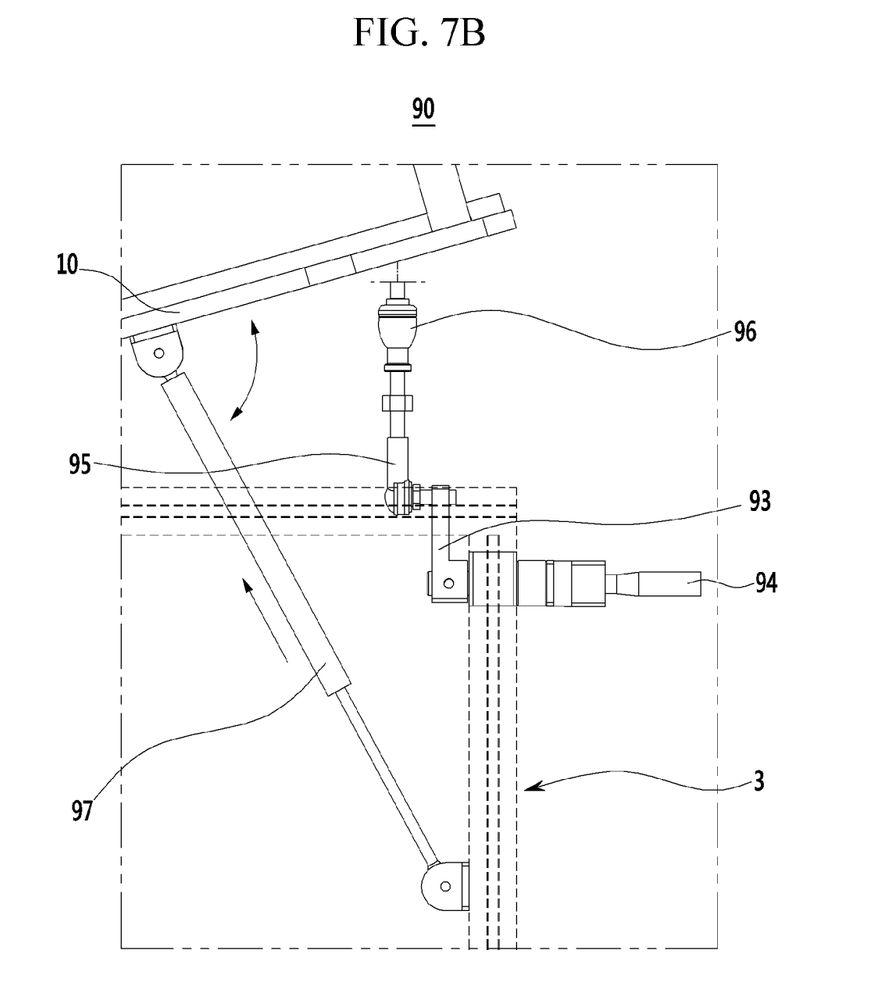

FIGS. 7A and 7B are diagrams illustrating a tilt unit applied to the apparatus for activating an MEA according to an exemplary embodiment of the present inventive concept.

Referring to FIGS. 6, 7A, and 7B, the tilt unit 90 is connected to the frame 3 and the base plate 10. The tilt unit 90 may include a tilt lever 93, a connection rod 95, and a pair of gas lifts 97.

The tilt lever 93 is rotatably installed on the other side of the frame 3 through an operation handle 94. That is, the tilt lever 93 is fixedly installed at a center of rotation of the operation handle 94 and rotates along with the operation handle 94.

The connection rod 95 has an end on one side rotatably coupled with the tilt lever 93 and has an end on another side connected to an end on the other side of the base plate 10. In this case, the end on the other side of the connection rod 95 may be connected to the end on the other side of the base plate 10 through a ball joint 96.

When the operation handle 94 rotates 180 degrees from one direction to another direction, the tilt lever 93 rotates along with the operation handle 94, thus upwardly moving the connection rod 95 and upwardly tilting the base plate 10. When the operation handle 94 rotates 180 degrees from the other direction to the one direction, the tilt lever 93 rotates along with the operation handle 94, thus downwardly moving the connection rod 95 and downwardly tilting the base plate 10.

The pair of gas lifts 97 support the tilting of the base plate 10 by the tilt unit 90. Each of the gas lifts 97 has an end on one side connected to a center of a bottom portion of the base plate 10 and has an end on another side connected to an end on the other side of the frame 3.

If the base plate 10 tilts upwardly, the gas lifts 97 may extend up and down, thus supporting the base plate 10. If the base plate 10 tilts toward its original location (i.e., a downward direction), the gas lifts 97 may extend and contracts up and down, supporting the base plate 10.

The gas lift 97 is a gas lift device that is widely known in the art, and thus, a detailed description of the construction thereof is omitted in this specification.

Hereinafter, the operation of the apparatus 100 according to an exemplary embodiment of the present inventive concept is described in detail with reference to the disclosed drawings.

First, referring to FIG. 1, when the base plate 10 is disposed horizontally on the frame 3, a pressure applied to the separation plates 20 is released by the press unit 40.

In this case, as illustrated in FIGS. 1 and 7A, the operation handle 94 of the tilt unit 90 rotates in one direction, and the tilt lever 93 of the tilt unit 90 rotates in the one direction (i.e., a downward direction).

Accordingly, the connection rod 95 of the tilt unit 90 moves downward, and the base plate 10 is horizontally disposed on the frame 3. Furthermore, the gas lifts 97 of the tilt unit 90 support the base plate 10 in a contraction state.

Referring to FIG. 1, the movable body 17, together with the press unit 40 and the support block 60, moves from one direction to another direction of the base plate 10 along the guide rails 19 on the base plate 10 and separates the separation plates 20 at specific intervals.

In this case, the separation plates 20 move in the other direction of the base plate 10 along the side guides 12 and the bottom guides 14, and thus, they are spaced apart from each other at specific intervals.

In this case, the link clips 31 of the connection link 30 is connected to both sides of the separation plates 20 through the first connection rings 26 and connected to both sides of the stationary body 15 and the movable body 17 through the second connection rings 16. Accordingly, the stationary body 15 and the movable body 17 maintain a specific interval.

That is, when the separation plates 20 move by the movable body 17 in the other direction of the base plate 10 through the side guides 12 and the bottom guides 14, the connection link 30 regularly maintains the intervals between the separation plates 20 as a stop link.

As illustrated in FIGS. 1 and 5A, the operation handle 85 of the elevation unit 80 rotates in one direction, and the elevation lever 81 and the elevation rod 83 rotate by the operation handle 85 in the one direction (i.e., an upward direction).

The elevation plate 71 of the location fixing member 70 upwardly moves along with the guide shafts 75 and the link bars 73 in the support block 60 by the elevation rod 83. Accordingly, the link bars 73 of the location fixing member 70 are detached from the coupling pins 77 of the stationary body 15 through the link holes 79 and folded to the elevation plate 71 on the basis of the link pins 78.

In this state, the MEA 1 for the activation and performance evaluation is input into a space between the separation plates 20. Then, the movable body 17, together with the press unit 40 and the support block 60, moves from the other direction of the base plate 10 to the one direction along the guide rails 19 by holding the operation handle 85 of the elevation unit 80, as illustrated in FIG. 2.

The separation plates 20 move in one direction of the base plate 10 along the side guides 12 and the bottom guides 14. Thus, the intervals between the separation plates 20 with the MEA 1 interposed between the separation plates 20 become narrow and then closely attach to both faces of the MEA 1.

Here, the link clips 31 of the connection link 30 link-rotate through the first connection rings 26 of the separation plates 20 and second connection rings 16 of the stationary body 15 and the movable body 17, thus supporting the separation plates 20 having the narrow intervals.

Thereafter, as illustrated in FIGS. 2 and 5B, the operation handle 85 of the elevation unit 80 rotates 180 degrees from one direction to the other direction. The elevation lever 81 and elevation rod 83 of the elevation unit 80 also rotate 180 degrees in the other direction (i.e., a downward direction). Accordingly, the elevation plate 71 of the location fixing member 70 downwardly moves due to its weight along with the guide shafts 75 and the link bars 73.

The link bars 73 of the location fixing member 70 are coupled with the coupling pins 77 of the stationary body 15 through the link holes 79, and thus fix the location of the support block 60 along with the elevation plate 71 with respect to the stationary body 15.

Thereafter, as illustrated in FIGS. 2 and 4, the press screw 61 of the support block 60 rotates in one direction. Accordingly, the press screw 61 moves the press block 41 of the press unit 40 in the one direction of the base plate 10 along the guide rails 19.

As a result, the spring members 45 within the press block 41 are compressed between the inner latch stage and the separation prevention rings 47 by the movement of the press block 41 in the state in which the spring members 45 are inserted into the press members 43 within the press block 41, thus providing a predetermined elastic force to the movable body 17.

The movable body 17 moves in the one direction of the base plate 10 along the guide rails 19 by the elastic force of the spring members 45, thus pressurizing the separation plates 20 between the stationary body 15 and the movable body 17. Accordingly, the separation plates 20 are pressurized by the movable body 17 with the MEA 1 interposed therebetween and are closely mounted to the MEA 1.

In the present disclosure, a fluid pipe is connected to the stationary body 15 through a fluid pipe connection unit (not illustrated), and an output cable and a connector are connected to the separation plates 20 and the unit fuel cells of the MEA 1.

When fuel and an oxidizer are supplied to the fluid pipe, they flow into the flow path plate 21 of the separation plates 20 through the stationary body 15 and are supplied to the MEA 1 through the flow path plate 21.

The unit fuel cells in which the MEA 1 is interposed between the separation plates 20 generate electrical energy through an electrochemical reaction between the fuel and the oxidizer.

Accordingly, in the present disclosure, an activation and performance evaluation process is performed on the MEA 1 using a method of measuring a voltage of the electrical energy generated by the fuel cells and applying a specific voltage from a fuel cell to an electronic load.

In the present disclosure, an abnormal cell (i.e., a bad unit fuel cell), that does not output predetermined electrical energy, can be detected through the activation and performance evaluation process for the MEA 1.

When the activation and performance evaluation process for the MEA 1 is completed as described above, the operation handle 94 of the tilt unit 90 rotates 180 degrees in the other direction, as illustrated in FIGS. 6 and 7B.

Accordingly, the tilt lever 93 of the tilt unit 90 rotates 180 degrees in the other direction (i.e., upward direction) by the operation handle 94. As a result, the connection rod 95 of the tilt unit 90 moves upwardly, and the base plate 10 tilts upwardly. In this case, the base plate 10 may tilt upwardly through the tilt unit 90 while the other side of the base plate 10 rotates around the rotation shaft 91 with respect to one side of the frame 3. Furthermore, the gas lifts 97 of the tilt unit 90 extend up and down and support the tilting of the base plate 10.

According to the present disclosure, since the base plate 10 tilts upwardly through the tilt unit 90, a coolant, which is generated when the MEA 1 is activated, can be discharged through the stationary body 15.

After the coolant is removed as described above, the operation handle 94 of the tilt unit 90 rotates again by 180 degrees in one direction, as illustrated in FIGS. 2 and 7A.

Accordingly, the tilt lever 93 of the tilt unit 90 also rotates 180 degrees in one direction (i.e., downward direction) by the operation handle 94. As a result, the connection rod 95 of the tilt unit 90 downwardly tilts the base plate 10 while downwardly moving.

The base plate 10 may tilt downwardly through the tilt unit 90 while the other side of the base plate 10 rotates around the rotation shaft 91 with respect to the one side of the frame 3 and thus may be horizontally disposed on the frame 3.

Here, the press screw 61 of the support block 60 rotates in another direction as illustrated in FIGS. 2 and 4. Accordingly, the press screw 61 moves the press block 41 of the press unit 40 in the other direction of the base plate 10 along the guide rails 19.

The spring members 45 within the press block 41 are relaxed between the inner latch stage and the separation prevention rings 47 by the movement of the press block 41 when they are inserted into the press members 43 within the press block 41, thus releasing an elastic force applied to the movable body 17 through the press members 43.

When the elastic force of the spring members 45 applied to the movable body 17 is released as described above, the movable body 17 moves in the other direction of the base plate 10 through the guide rails 19, thus releasing pressure applied to the separation plates 20 between the stationary body 15 and the movable body 17.

Thereafter, the operation handle 85 of the elevation unit 80 rotates 180 degrees from the other direction to the one direction, as illustrated in FIGS. 1 and 5B.

The elevation lever 81 and elevation rod 83 of the elevation unit 80 also rotate 180 degrees in the one direction (i.e., upper direction). As a result, the elevation plate 71 of the location fixing member 70 moves upwardly along with the guide shafts 75 and the link bars 73.

Accordingly, the link bars 73 of the location fixing member 70 are detached from the coupling pins 77 of the stationary body 15 through the link holes 79, thus releasing the location of the support block 60 fixed to the stationary body 15 along with the elevation plate 71.

Thereafter, the movable body 17, together with the press unit 40 and the support block 60, moves from the one direction of the base plate 10 to the other direction along the guide rails 19 by holding the operation handle 85 of the elevation unit 80, as illustrated in FIG. 1.

Accordingly, the separation plates 20 move in the other direction of the base plate 10 along the side guides 12 and the bottom guides 14, thus maintaining specific intervals therebetween.

Here, the separation plates 20 maintain regular intervals between the stationary body 15 and the movable body 17 because the link clips 31 of the connection link 30 are connected to both sides of the separation plates 20 through the first connection rings 26, and the separation plates 20 are connected to both sides of the stationary body 15 and the movable body 17 through the second connection rings 16.

Then, the MEA 1 placed between the separation plates 20 is drawn out, and the MEA 1 of the abnormal cell is removed or replaced with a new cell.

Accordingly, when fully functional MEA 1, on which the activation and performance evaluation process is completed, moves to a stack assembly process, a fuel cell stack, that is, an aggregate of unit fuel cells, is assembled by stacking the MEA 1 along with the separation plates used for the fuel cell stack in the stack assembly process.

In accordance with the apparatus 100 for activating an MEA for fuel cells according to the exemplary embodiment of the present inventive concept, the MEA 1 can be activated before fuel cells are assembled into a fuel cell stack.

Further, the activation and performance evaluation process can be performed on the MEA 1, and fuel cells can be assembled into a fuel cell stack in the state in which an abnormal cell is detected.

Accordingly, the abnormal fuel cell can be replaced or removed, and the fuel cells can be assembled simply when the activation and performance evaluation are performed on the fuel cells after the fuel cells are assembled into the fuel cell stack and the abnormal fuel cell is detected in the fuel cells of the fuel cell stack as in a conventional art.

Furthermore, according to the present disclosure, a time taken to perform the activation and performance evaluation on the MEA 1 can be reduced, and productivity of the fuel cell stack can be further improved.

According to the present disclosure, the improvement of productivity and a reduction of a failure rate can be expected because a conventional process of exploding a fuel cell stack and stacking fuel cells is omitted by removing the MEA 1 having the abnormal bad cell before the fuel cell stack is assembled. Furthermore, the abnormal cell can be rapidly replaced by securing the activated MEA 1 before stacking the fuel cells.

Although the present disclosure has been described above, the technical spirit of the present disclosure is not limited to the exemplary embodiments proposed in this specification. Those skilled in the art who understand the technical spirit of the present invention may easily propose other exemplary embodiments by supplementing, changing, deleting, and adding constituent elements within a range of the same technical spirit. However, those supplements, changes, deletions, and additions may be construed as falling within the range of the present invention.

What is claimed is:

1. An apparatus for activating an MEA for fuel cells, the apparatus comprising:
   a stationary body fixedly mounted on a top portion of a base plate;
   a movable body disposed on the top portion of the base plate to slide in a reciprocating motion along guide rails;
   a plurality of separation plates spaced apart from each other between the stationary body and the movable body and maintaining each space between the plurality of separation plates in which the MEA is interposed; and
   a connection link, which is connected to the stationary body and the movable body, link-coupling the plurality of separation plates at each side of the plurality of separation plates.

2. The apparatus of claim 1, further comprising:
   a press unit, which is slidably coupled with the guide rails, connected to and pressurizing the movable body;
   a support block, which is attached to the press unit through a press screw and slidably coupled with the guide rails, applying pressure to the press unit by the press screw; and
   a location fixing member coupled with the support block to move up and down and selectively coupled with the stationary body.

3. The apparatus of claim 1, further comprising an end plate disposed between the plurality of separation plates and the movable body.

4. The apparatus of claim 3, wherein:
   the plurality of separation plates receive a fuel and an oxidizer and discharge an unreacted fuel, the oxidizer, and a coolant through the stationary body.

5. The apparatus of claim 1, wherein the stationary body includes a pair of side guides, which are fixedly mounted to the stationary body, penetrating both sides of the plurality of separation plates and guiding the plurality of separation plates.

6. The apparatus of claim 5, wherein the stationary body further includes a pair of bottom guides, which is fixedly mounted thereto, penetrating a bottom portion of the plurality of separation plates and guiding the plurality of separation plates.

7. The apparatus of claim 1, wherein each of the plurality of separation plates comprises:
   a flow path plate made of a graphite material and having flow path patterns on both sides of the flow path plate; and
   a sub-plate made of a steel material and bonded to an edge of the flow path plate.

8. The apparatus of claim 7, wherein the flow path plate is bonded to the sub-plate through epoxy adhesives.

9. The apparatus of claim 6, wherein each of the plurality of separation plates comprises:
   a flow path plate made of a graphite material and having flow path patterns on both sides of the flow path plate;
   a sub-plate made of a steel material and bonded to an edge of the flow path plate; and
   first guide holes, into which the pair of side guides are inserted, formed at upper edges on both sides of the plurality of separation plates.

10. The apparatus of claim 9, wherein the each of the plurality of separation plates further comprises second guide holes, into which the a pair of bottom guides are inserted, formed at a bottom side of the plurality of separation plates, and
    wherein the flow path plate is bonded to the sub-plate through epoxy adhesives.

11. The apparatus of claim 10, wherein the pair of side guides are inserted into the first guide holes and are in contact with the flow path plate, and the pair of bottom guides are inserted into the second guide holes and in contact with the flow path plate, and
    wherein the plurality of separation plates have a polytetrafluoroethylene (PTFE) tape made of an insulating material bonded to a surface of the pair of side guides and a surface of the pair of bottom guides.

12. The apparatus of claim 1, wherein the connection link comprises a plurality of link clips link-coupled with first connection rings, which are attached to both sides of the plurality of separation plates, and second connection rings, which are attached to both sides of the stationary body and the movable body.

13. The apparatus of claim 12, wherein the plurality of link clips, which are provided in an even number to connect the plurality of separation plates through the first connection rings, are disposed in a first line, and
    wherein the plurality of link clips, which are provided in an odd number to connect the plurality of separation plates through the first connection rings and connect the stationary body and the movable body through the second connection rings, are disposed in a second line.

14. The apparatus of claim 2, wherein the press unit comprises:
    a press block slidably coupled with the guide rails;
    a plurality of press members penetrating the press block and coupled with the movable body; and
    spring members disposed on the press member within the press block and applying an elastic force to the movable body through the press member.

15. The apparatus of claim 14, wherein the press screw, which penetrates the support block, is rotatably connected to the press block through a bearing and screwed onto the press block.

16. The apparatus of claim 15, wherein the support block includes a stopper engaged the press screw and fixing the movement of the movable body.

17. The apparatus of claim 2, wherein the location fixing member comprises:
    an elevation plate mounted on the support block to move up and down by guide shafts; and
    at least one link bar link-coupled with the elevation plate and selectively coupled with the stationary body.

18. The apparatus of claim 17, wherein the link bar is selectively coupled with a coupling pin mounted on the stationary body,
    one end of the link bar is link-coupled with the elevation plate through a link pin, and
    another end of the link bar is selectively coupled with the coupling pin through the link hole.

19. The apparatus of claim 17, wherein the support block includes an elevation unit for moving the elevation plate along with the guide shafts and the link bar up and down.

20. The apparatus of claim 19, wherein the elevation unit comprises:
    an elevation lever rotatably mounted to the support block through an operation handle; and an elevation rod fixedly attached to the elevation lever to lift or lower the elevation plate.

21. The apparatus of claim 1, wherein the base plate is mounted on a top portion of a frame that is movable by casters mounted to on a bottom portion thereof.

22. The apparatus of claim 21, wherein the base plate tilts upwardly with respect to the frame through a tilt unit.

23. The apparatus of claim 22, wherein the stationary body discharges a coolant generated when the MEA is activated as the base plate tilts upwardly by the tilt unit.

\* \* \* \* \*